J. LAESSKER.
DEVICE FOR TESTING THE TEETH OF BEVEL GEAR WHEELS.
APPLICATION FILED JAN. 5, 1917.
1,296,195.
Patented Mar. 4, 1919.
2 SHEETS—SHEET 1.
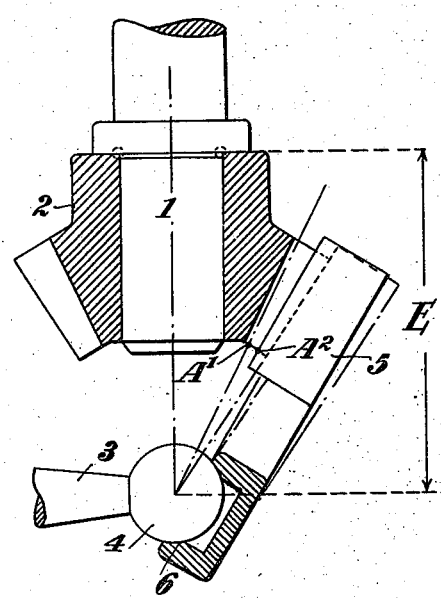
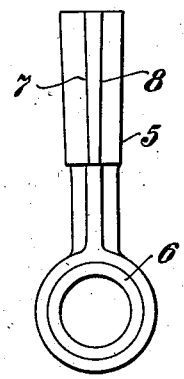
Inventor:
Jean Laessker,
By
Atty.

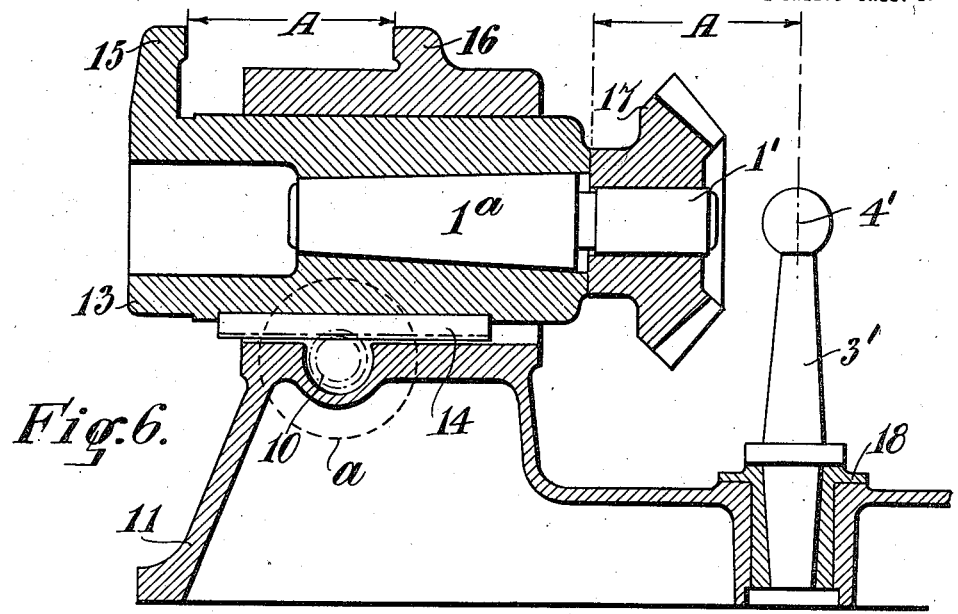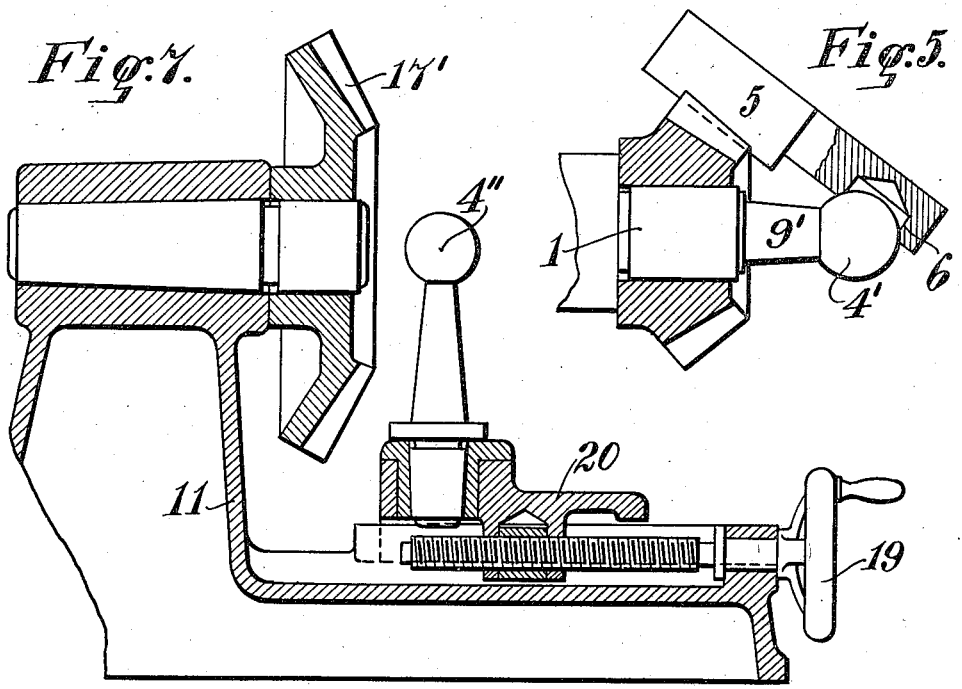

UNITED STATES PATENT OFFICE.

JEAN LAESSKER, OF ARBON, SWITZERLAND, ASSIGNOR TO ADOLPH SAURER, OF ARBON, SWITZERLAND.

DEVICE FOR TESTING THE TEETH OF BEVEL GEAR-WHEELS.

1,296,195.  Specification of Letters Patent.  Patented Mar. 4, 1919.

Application filed January 5, 1917. Serial No. 140,797.

*To all whom it may concern:*

Be it known that I, JEAN LAESSKER, a citizen of the Kingdom of Sweden, and residing at Arbon, Switzerland, Velostrasse 67, have invented certain new and useful Improvements in Devices for Testing the Teeth of Bevel Gear-Wheels, of which the following is a specification.

This invention relates to devices for testing the direction of the faces of the teeth of bevel gear-wheels.

Such a device adapted for practical use must meet various requirements. Firstly, it must enable a tooth of a bevel gear-wheel to be examined quickly and reliably as to whether all parts of its faces are directed exactly toward the point of intersection or the axes of the two gear-wheels forming a pair. Secondly, it must be possible to employ the device for testing bevel gear-wheels of various diameters and angles. Thirdly, it must admit of readily passing on from one tooth to another. Further, if a straight-edge is used, its one end must be placed on the part of the tooth to be tested, and its other on a point of support on the surface of a ball. It is advantageous if the straight-edge can be freely turned about its testing edge during the testing operation, in order to be able to test the flanks, top and base of the gear tooth as desired with the edge or face of the straight-edge. Preferably the straight-edge will be pressed perpendicularly against the part of the tooth under test and at the same time and in the same direction against the support provided for it. When changing from one part of a tooth to another part it is necessary to move the straight-edge about the support to different positions determined by the shape of the tooth. The point of support must shift correspondingly in such a manner that the line of support remains at right-angles to the edge or face of the straight-edge. In addition, the straight-edge must bear theoretically in one line only on the point of support, a condition difficult to be fulfilled. Further, in order that the workman may not be disturbed when placing another wheel to be tested into position, it is necessary that the straight-edge can be readily applied and removed.

A primary object of this invention is to provide a device of the type described which meets these requirements as fully as possible. To this end, the support of the improved testing device is spherical, and the testing edges and faces of the straight-edge are arranged so as to be directed toward the center of the sphere. The sphere may either be used as the support for the one end of the straight-edge, or it may be mounted on one end of the same and received in a suitable, relatively fixed seat. The latter arrangement has the important advantage that the test can be performed rapidly and reliably, and there is no need to swing the straight edge about the support. Consequently, when testing a bevel gear-wheel having a different diameter and a different angle *i. e.* a wheel of different conicity, it is necessary to change only one condition of the point of support, that is to say the distance of the sphere from the bevel gear. Such a change of distance can be brought about by a simple well-known device.

The invention consists in the construction arrangement and combination of parts described hereinafter and pointed out in the claims.

One embodiment of the invention and a modification thereof are represented by way of example in the accompanying drawing, wherein:—

Figure 1 is a view in side elevation, partly in section, showing one form of the improved testing device in which a sphere constitutes a support for one end of the straight-edge, Figs. 2 and 3 show the straight-edge in front and end elevation, respectively, a gear tooth being indicated in Fig. 3;

Fig. 4 is a view in side elevation of a modified testing device comprising a sphere mounted on one end of the straight-edge and bearing against a seat provided therefor, Fig. 5 shows the ball spindle mounted in the end of the wheel journal.

Fig. 6 is a vertical section showing means for moving the wheel to be tested to or from the ball, and Fig. 7 is a similar view in which the ball is moved to or from the wheel.

Refering to Figs. 1 to 3, the bevel gear-wheel 2 to be tested is mounted on a journal 1. A sphere 4 is carried by the support 3 which can be located at various distances from the journal 1, because when testing every bevel gear-wheel the center of the sphere must coincide with the point of intersection of the axes of the pair of wheels which are to mesh together. The one end of the straight-edge 5 has a bearing or seat 6 for bearing against the sphere 4, while the testing edges 7 and 8 clearly shown in Figs. 2 and 3 at the other end are directed toward the center of the sphere, that is, are positioned so that they shall be true radii of the sphere. Fig. 3 shows one manner of applying the straight-edge 5 with its edge 7 to a tooth of the wheel 2 to be tested. It will be understood that the support 3 of the sphere 4 may occupy a position other than that shown, e. g. that of the support 9 in Fig. 4. The points $A^1$ and $A^2$ in Fig. 1 show two positions of the straight-edge when testing, and the dotted line indicates the position of the straight-edge when testing the top edge or top face of a tooth. E indicates the variable distance of the sphere 4 from the journal 1.

In the modification of the testing device shown in Fig. 4 the sphere 4' is mounted on the one end of the straight-edge and bears against the bearing or seat 6' formed on the end of the support 9. If desired, this support 9 may occupy a position other than that shown, e. g. that of the support 3 in Fig. 1.

It is to be understood that the sphere 4' may be mounted on the support 9 and the seat 6' may be formed on the straight-edge 5 and that the sphere 4' may be mounted on an extension of the journal 1 as shown in Fig. 5. Mechanical devices for supporting the sphere in the line of the axis of the gear and for changing its distance according to the conicity of the gear are shown in Figs. 6 and 7. Thus, the sphere 4' may be mounted on a support 9' mounted in and projecting from the end of the journal 1 on which the wheel to be tested is mounted, and the seat 6 may be formed on the straight edge 5, as shown in Fig. 5. In Fig. 6 the sphere is shown as held in the line of the axis of the gear by a support 3' mounted in a conical bushing or seat 18 of a frame 11. In said frame 11 is a pinion 10 on whose shaft is a hand wheel $a$. The pinion gears in a rack 14 fixed on a non-rotatable slide 13 which carries the removable spindle 1' provided with a tapered end $1^a$.

The wheel 17 to be tested is mounted on the cylindrical journal 1'. By means of the rack and pinion 10, 14, the slide 13 may be shifted and with it the wheel 17. The slide 13 carries an arm 15, and on the frame 11 is a corresponding arm 16.

In order to adjust the space between the sphere 4' and the wheel to be tested, a measure having the length A is put between the arms 15 and 16 and the hand wheel turned until the arms 15 and 16 touch the ends of the measure, at which time the sphere 4' will be in the desired position. And in order to test conical wheels having different bores on the slide 13, there are used other spindles having the same taper $1^a$ but different diameters of journal 1' dimensioned to suit the bores of the wheels.

The bushing 18 of the frame 11 carries a pin or post 3' having the sphere 4' or a seat 6'.

If a gear of a different conicity is to be tested, the post 3' and the wheel 17 are removed, and the spindle 1' replaced by another fitting the bore of the new gear to be tested.

Another mode of adjusting the distance between the sphere and gear is shown in Fig. 7, adjustment for different conicities of gears being effected by means of a hand wheel 19 which operates a slide 20 carrying the spindle and sphere 4''.

I claim:

1. In a device for testing the teeth of bevel gear-wheels, the combination of a straight-edge and a sphere seated thereon, the center of the sphere being normally located in a line with the axis of the wheel to be tested, and the testing edge of the straight-edge being positioned as a radius of the sphere.

2. In a device for testing the teeth of bevel gear-wheels, the combination of a sphere and a support normally carrying the latter with its center located in a line with the axis of the wheel to be tested, with a straight-edge having a seat for the sphere, the testing edge of the straight-edge being positioned as a radius of the sphere when the latter is seated on said seat.

3. In a device for testing the teeth of bevel gear-wheels, the combination of a straight-edge and a sphere mounted on one end thereof with a support mounted in alinement with the axis of the wheel to be tested, one end of the support having a seat for the sphere, the testing edge of the straight-edge being positioned as a radius of the sphere when the latter is seated on said seat.

4. In a device for testing the teeth of bevel gear-wheels, the combination of a bar having a circular seat at one end thereof, and a sphere normally seated on said seat, the other end of the bar having a projecting portion having two rectilinear edges each positioned as a radius of the sphere.

5. In a device for testing the teeth of bevel gear wheels, two members, one of them a bevel wheel support and the other a testing edge support, one of said members displaceable with respect to the other, and a testing edge coöperating with said support to support one end of said edge in any testing position with the line of the edge intersecting the axis of the wheel.

6. In a device for testing the teeth of bevel gear wheels, a bevel wheel supporting member and a testing edge supporting member, one of said members displaceable with respect to the other, and a straight edge member coöperating with said supporting member, one of the two latter members having a sphere thereon and the other member having a bearing for said sphere, the center of said sphere being arranged in the axis of the wheel under all conditions of operation.

7. A device for testing the teeth of bevel gears, comprising a support for the gear to be tested, a spherical bearing having its center in the line of the axis of the gear, and a straight edge supported by said bearing and having its testing edge positioned as a radius thereof.

In testimony whereof I have signed my name to this specification in the presence of two witnesses.

JEAN LAESSKER.

Witnesses:
   FRANK DIMMKE,
   EMIL MEILE.